Dec. 10, 1940.   W. MAHNKEN   2,224,193
TUNING CONTROL SYSTEM FOR RADIO RECEIVERS
Filed Dec. 27, 1938

INVENTOR.
WERNER MAHNKEN
BY
ATTORNEY.

Patented Dec. 10, 1940

2,224,193

UNITED STATES PATENT OFFICE 2,224,193

TUNING CONTROL SYSTEM FOR RADIO RECEIVERS

Werner Mahnken, Blankenfelde, Germany, assignor to Telefunken Gesellschaft für Drahtlose Telegraphie m. b. H., Berlin, Germany, a corporation of Germany Application December 27, 1938, Serial No. 247,926
In Germany January 19, 1938

3 Claims. (Cl. 74—230.18)

In the usual cord drives for the transmission between the shaft of the tuning means of a receiver and the pointer moved in front of a fixed dial the disadvantage exists that owing to the mechanical and electrical inaccuracies which the production entails, the transmission ratio between the shaft for the tuning means and the cord moving the pointer has not the correct value to bring the dial indication over the entire range to coincide with the actually set receiving frequency. Therefore, it is desirable that the transmission ratio between the shaft of the tuning means and the cord for the pointer can be varied within narrow limits after completing the receiver.

According to the present novel feature this is accomplished in a very simple manner in that the cord disk over whose circumference the drive cord coupled with the dial indicator is placed, consists of two or a greater number of sector shaped parts displaceable relative each other at a short distance in the radial direction.

More particularly the cord disk shall consist of two semi-circular parts whose straight edges face one another across a short distance whereby the said distance is variable. Despite the difference of the shape of the disk from the exact circle, it is possible, if desired, to obtain a constant variation in the transmission across the entire turning range if the cord drive is so designed that the cord is rigidly guided on the entire circumference of the disk.

Figure 1:
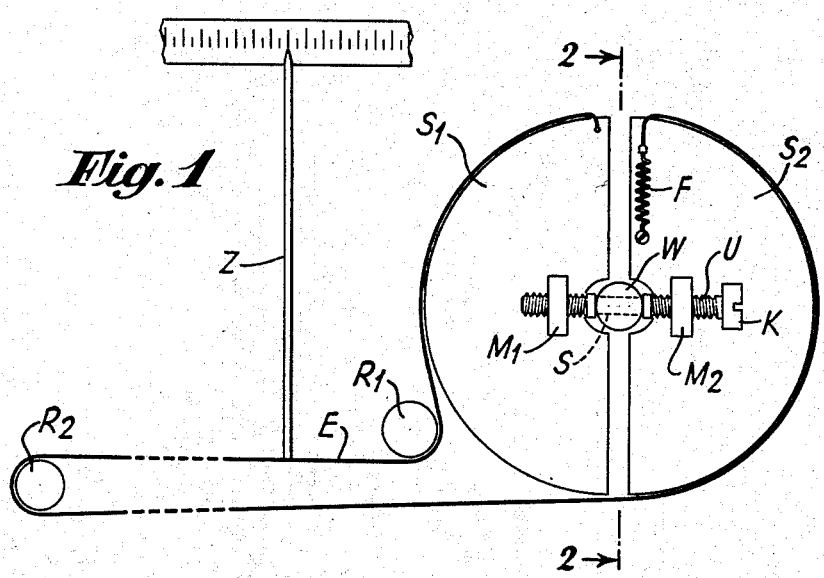
Figure 2:
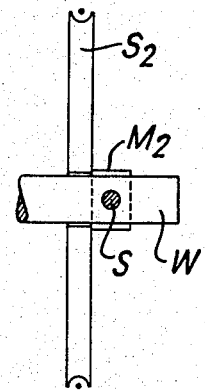
Figure 3:
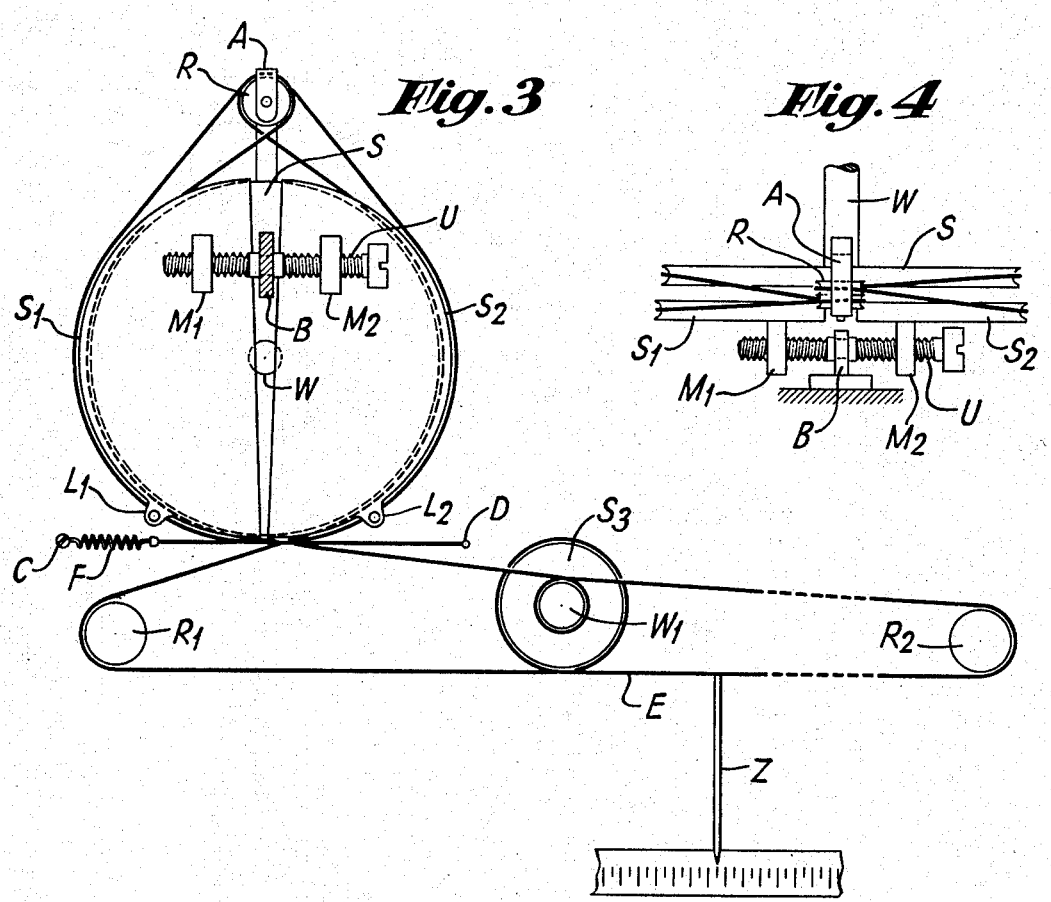
Figure 4:
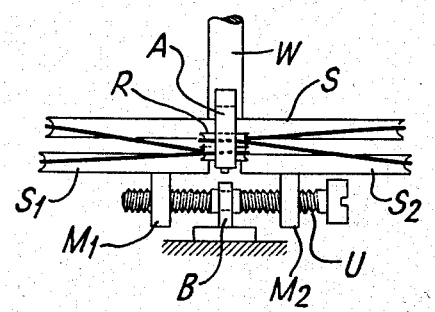

The invention will best be understood by reference to the following description taken in connection with the accompanying drawing in which Fig. 1 is a front view of a construction according to the invention, Fig. 2 is a view partly in section taken along line 2—2 of Fig. 1, Fig. 3 is a front view of a modified construction, and Fig. 4 is a plan view of Fig. 3. A screw U can turn in the free end of the shaft W of the variable condenser of a receiver whereby the said screw is disposed at right angle to the shaft but can neither be moved in the axis of the shaft nor in the axis of the screw. The part of the screw protruding from the one side of the shaft has lefthand thread and the other part has right hand thread. The two parts turn each in a respective square head nut $M_1$ and $M_2$ which in turn are connected each rigidly with a respective semi-circular disk $S_1$ and $S_2$. These disks face one another across a short distance with the straight sides and form the two halves of a cord disk which rotates together with the shaft of the variable condenser. By turning the screw U the two disk parts $S_1$ and $S_2$ can be brought nearer or can be moved away from one another. The screw has a head K provided with a slot thus enabling the turning of the screw by means of a screw driver.

A cord or a wire E is placed around the circumference of the two disk parts $S_1$ and $S_2$ which circumference has a groove to this end and the said cord is placed almost completely around the entire circumference of the two disks and furthermore around the rollers $R_1$ and $R_2$. At the long span of the cord extending between the roller $R_1$ and roller $R_2$ there is fastened the pointer Z moving in front of a dial (not shown). The free ends of the cord are fixedly secured to the cord disk whereby the one end of the cord has an expanded spring F connected thereto so as to obtain an approximately constant tension force.

The transmission ratio between the shaft of the variable condenser and the pointer moving in a straight line can be increased by moving the two disk parts $S_1$ and $S_2$ away from each other while a closer position of the said parts decreases the said ratio yet the point of gravity of the disk formed of the two parts $S_1$ and $S_2$ always remains in the axis of the shaft W of the variable condenser.

Referring to the modified construction in Figs. 3 and 4 the shaft W of the variable condenser carries an arm A provided with a rotatable roller R. The shaft furthermore has a cord disk S rotatably fastened thereto. Two substantially fixed semi-circular disk parts $S_1$ and $S_2$ are arranged in front of the cord disk which in a manner similar to the arrangement according to Figure 1 form a cord disk having a variable diameter. The cord passes from the fixed point D over the grooved circumference of the semi-circular disk $S_1$ to the roller R and then over the movable disk S to the shaft $W_1$ carrying the knob (not shown) for the vernier tuning whereby the said cord is wound several times around this shaft. Furthermore, the cord is placed over the roller $R_2$ from where it is returned to a cord disk $S_3$ mounted concentrically with respect to the shaft $W_1$ and then it is connected across a hollow shaft surrounding the shaft $W_1$, with a second operating knob for the rough tuning. Then the cord is laid over the return roller $R_1$, the movable cord disk S, then back to the roller R and from there it is placed over the semi-circular disk $S_2$ and connected to a fixed point C across an expanded spring F. At one of the long spans of the cord the pointer Z is again fixedly secured. The arrangement already proposed and shown with the arm A, the rotatable disk S and the locally fixed cord disk formed by the parts $S_1$ and $S_2$ acts in the manner of a pulley arrangement thereby furnishing a doubling of the transmission ratio for the dial pointer.

In order that according to the novel feature, the transmission ratio between the shaft of the variable condenser and the moving pointer can be varied within narrow limits, a screw U is employed similar to that of Figure 1 which is locally fixed in the block B in the center thereof and consists of two parts having opposite threads each of which turning in a respective nut $M_1$ and $M_2$. These nuts are fastened to the disk parts $S_1$ and $S_2$ respectively. The two parts $S_1$ and $S_2$ furthermore, are rotatably mounted through two eyes $L_1$ and $L_2$ in locally fixed places so that they can be tilted slightly about these bearings when the screw is being turned.

I claim:

1. In a tuning control system for a radio receiver of the type provided with a rotary adjustable shaft which is adapted to be actuated through a cord drive and a pulley associated with said shaft, said pulley being formed of two semi-circular parts each provided with an ear member which is internally threaded, a screw having end portions provided respectively with a right hand thread and a left hand thread and an unthreaded intermediate portion which is engaged by means restraining the screw from lengthwise movement but permitting rotary movement, said end portions of the screw threading through their respective ear members, whereby adjustment of the screw is adapted to vary the separation of the semi-circular parts constituting the pulley and hence its effective diameter thereby resulting in variations of the transmission speed to said cord drive.

2. In a tuning control system for a radio receiver of the type provided with a rotary adjustable shaft which is adapted to be actuated through a cord drive and a pulley carried by said shaft, said pulley being formed of two semi-circular parts each provided with an ear member which is internally threaded, a screw having end portions provided respectively with a right hand thread and a left hand thread and an intermediate portion which is unthreaded and which engages a transverse slot in the rotary shaft in which is restrained from lengthwise movement but is permitted to have rotary movement, said end portions of the screw threading through their respective ear members, whereby adjustment of the screw is adapted to vary the separation of the semi-circular parts constituting the pulley and hence its effective diameter thereby resulting in variations of the transmission speed to said cord drive.

3. In a tuning control system for a radio receiver of the type provided with a rotary adjustable shaft which is adapted to be actuated through a cord drive and a pulley associated with said shaft, said pulley being formed of two semi-circular parts each being pivotally mounted on a fixed support and each provided with an ear member which is internally threaded, a screw having end portions provided respectively with a right hand thread a left hand thread, an intermediate portion of said screw being unthreaded and adapted to be engaged by means restraining the screw from lengthwise movement but permitting rotary movement, said restraining means comprising a bearing member carried by the fixed support, said end portions of the screw threading through their respective ear members, whereby adjustment of the screw is adapted to vary the separation of the semi-circular parts constituting the pulley by swinging the parts about their pivotal points and hence varying the effective diameter of the pulley thereby resulting in variations of the transmission speed to said cord drive.

WERNER MAHNKEN.